United States Patent [19]
Pechi

[11] 3,756,487
[45] Sept. 4, 1973

[54] MULTIPLE SELECTIVE SINGLE TAPE CARTRIDGE DRIVE FROM A CONSTANT DRIVE MECHANISM

[75] Inventor: Louis L. Pechi, San Diego, Calif.

[73] Assignee: Precision Design Corp., San Diego, Calif.

[22] Filed: Aug. 14, 1972

[21] Appl. No.: 280,560

[52] U.S. Cl. .................. 226/110, 226/176, 274/4 F, 274/4 G

[51] Int. Cl. .................. B65h 17/42

[58] Field of Search .................. 226/109, 110, 194, 226/176, 177, 180, 174; 274/4 F, 4 G

[56] References Cited

UNITED STATES PATENTS 3,388,846 6/1968 Higgins .................. 226/109 X 3,432,082 3/1969 Beuille et al. .................. 226/110

*Primary Examiner*—Allen N. Knowles
*Attorney*—Carl R. Brown et al.

[57] ABSTRACT

A constant drive mechanism for driving multiple single tape cartridges, having a slotted sleeve fitting over a constant drive capstan spindle and positioned between the pressure rollers of each of the tape cartridges, that when rotated allows selective ones of the pressure rollers of the tape cartridges to contact the capstan spindle and be selectively driven.

5 Claims, 3 Drawing Figures

MULTIPLE SELECTIVE SINGLE TAPE CARTRIDGE DRIVE FROM A CONSTANT DRIVE MECHANISM

BACKGROUND OF THE INVENTION

Single tape cartridge drive systems for driving single tape cartridges with outwardly projecting pressure rollers, generally comprise complicated mechanisms that either move a single drive to multiple positions or move the tape cartridges relative to a single drive roller. Both require complicated mechanisms, relative precise alignment, and the moving of the cartridges or the drive system relative to the other.

Thus it is advantageous to have a system that does not require vertical or longitudinal movement of either the drive mechanism relative to multiple tape cartridges or movement of the multiple tape cartridges relative to the drive mechanism.

SUMMARY OF THE INVENTION

In an embodiment of this inveniton, a housing aligns a plurality of stacked, single-tape cartridges having externally projecting pressure rollers, along the longitudinal length of a driving shaft or capstan spindle. The spindle may be continuously driven by a drive motor. The single cartridges are positioned so that the pressure roller, which is spring biased, is biased to contact the rotating spindle. A sleeve encircles the spindle and is positioned between the spindle and the pressure rollers. The sleeve has a plurality of slots spaced along its length that are in alignment with the pressure rollers. The slots are large enough to allow the pressure rollers to move into driving contact with the spindle. The slots are circumferentially spaced so that only one pressure roller contacts the spindle at any given time. The sleeve is rotatable relative to the pressure rollers so that the pressure rollers selectively contact the spindle as determined by the circumferential position of the sleeve relative to the cartridges and their pressure rollers. Thus by rotating the sleeve, any selected one of the pressure rollers of the single tape cartridges may be driven thus moving the tape across a tape head mechanism. This causes each of the single cartridges to be selectively driven without requiring any relative movement between the tape cartridges and the spindle.

It is therefore an object of this invention to provide a new and improved tape drive mechanism that selectively drives individually, single tape cartridges by a constant drive mechanism.

It is another object of this invention to provide a new and improved drive mechanism that drives single tape cartridges without requiring relative positional movement between the cartridges and the drive mechanism.

Other objects and many advantages of this invention will become more apparent upon a reading of the following detailed description and an examination of the drawing wherein like reference numerals designate like parts throughout and in which.

Figure 1:
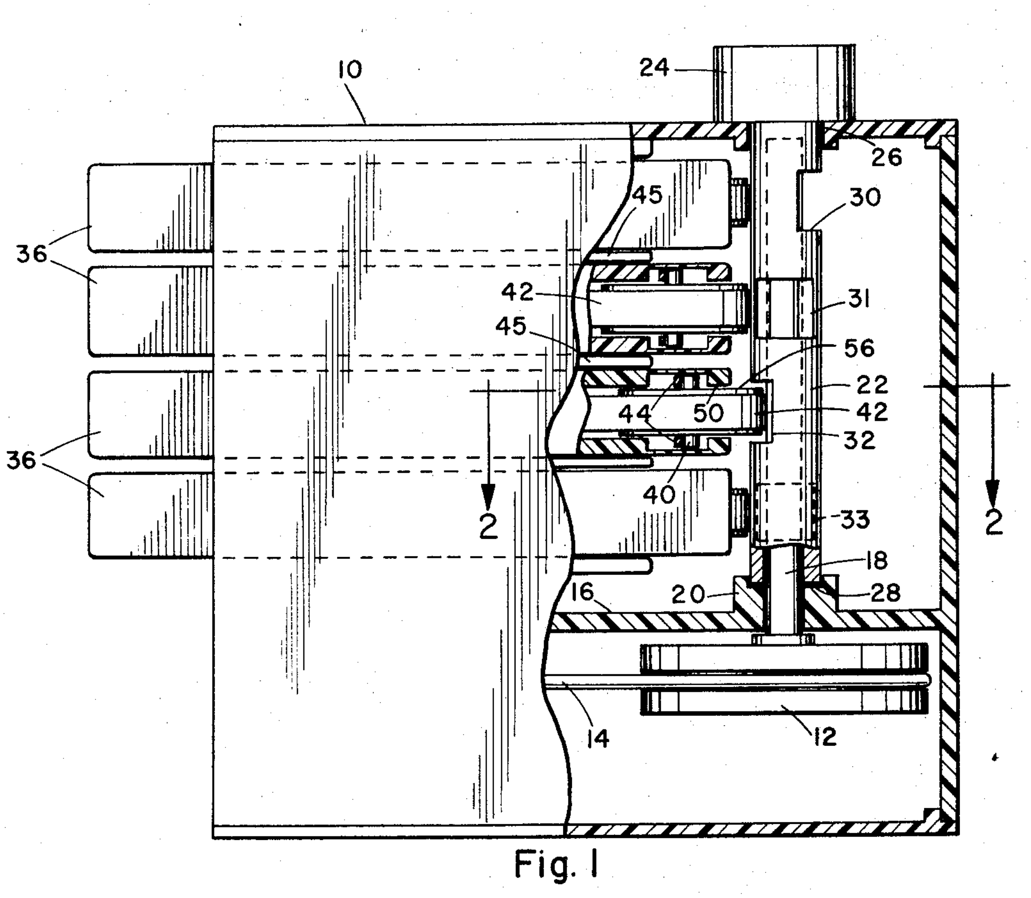
FIG. 1 illustrates a side elevational view with parts broken away, of the drive mechanism for driving a plurality of single tape cartridges.

Referring now to the drawing, a housing 10 encloses a tape driving mechanism comprising a motor 15 and a drive member 14 for driving pulley 12 that in turn rotates shaft or capstan spindle 18. Spindle 18 passes through wall 16 and through bearing connection 20, that can be any suitable bushing or the like that holds pulley 12 and spindle 18 in position. A selector sleeve 22, that is connected at one end to a sleeve indexing knob 24 having indexing marks 25, projects through opening 26 in the side of the housing 10 with its other end resting in recess 28 in bearing 20. Also positioned in the housing 10 are a plurality of stacked single cartridge tape units 36, that in this embodiment are illustrated as being four in number. Each of these cartridges rest on spacer ribs 45 and are held in position in any suitable manner, such as by a notch in the side as is known.

Figures 2, 3:
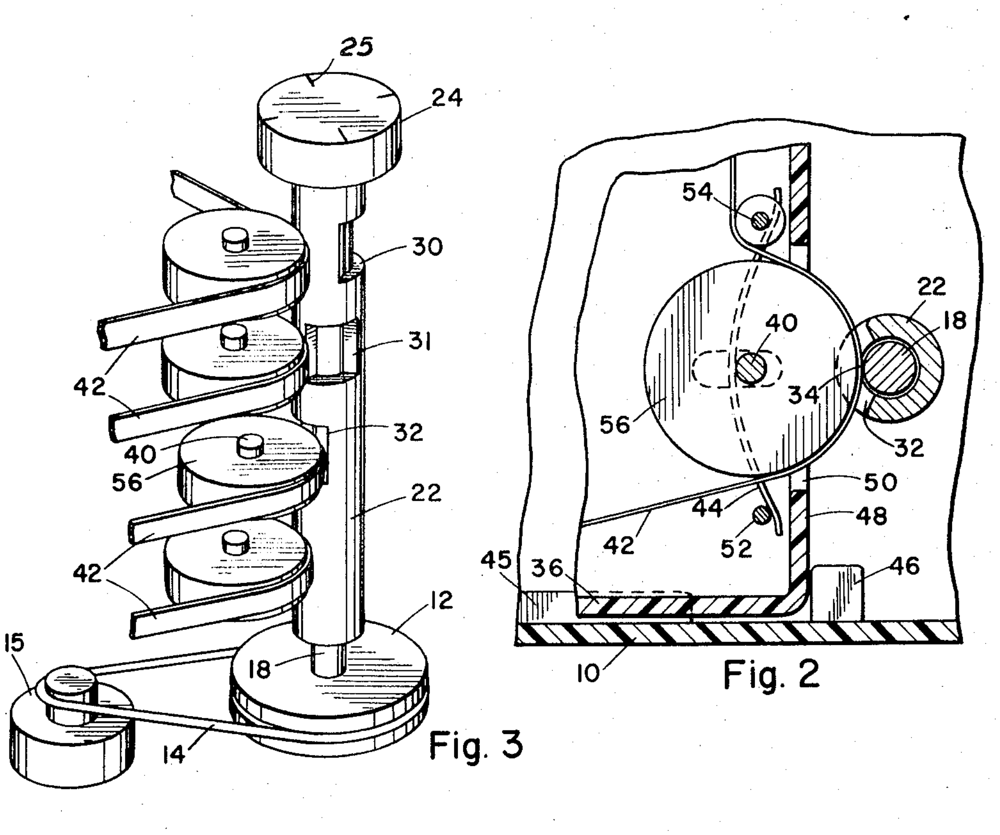
FIG. 2 is an enlarged sectional view taken along line 2—2 of FIG. 1.
FIG. 3 is a schematic illustration of the orientation of the drive mechanism and the pressure rollers of multiple single tape cartridges.

Each of the cartridges have a known structure with a spring biased drive roller 56. The drive roller 56 rotates on a shaft 40 that is held in position by a pair of leaf springs 44. The leaf springs 44 are held by retainer 52 and the roller retainer 54. The biasing springs 44 bias the drive roller and the tape 42 outwardly from the end of the cartridge housing 36, see FIG. 2, through opening 50 in end member 48.

The selector sleeve 22 has a plurality of spaced slots 30, 31, 32 and 33 that are aligned with the drive rollers of each of the cartridges 36. These slots are circumferentially oriented one to the other so that only one slot is aligned with one of the parallel oriented cartridges at any given time. When one of the slots is oriented with one of the cartridges, such as slot 32, then the drive roller 56 of that cartridge is biased into contact with the spindle 18 through the opening of the slot 32. The pressure roller 56 forces the tape 42 into contact at 34 with the spindle 18. The other slots may be rotated into contact with other pressure rollers of others of the cartridges, by rotating the sleeve 22. The slots in sleeve 22 have rounded edges allowing the pressure rollers to be cammed out of the slots to rest against the outer surface of the sleeve 22, without damaging the magnetic tape in the cartridges.

In operation, the motor 15 normally drives the capstan spindle continuously. Sleeve 22 is rotated either manually by rotating knob 24 or the sleeve may be rotated by a motorized mechanism, not shown, to correctly orient the slots such as slots 30, 32, 31 or 33 with the desired cartridge. When so aligned the particular pressure roller of the particular type cartridge is biased through the slot opening into contact with the spindle 18, whereby the spindle rotates the pressure roller 56 moving the tape 42.

The tape 42 then passes through an appropriate tape head mechanism, not shown. The lock mechanism in housing 10 locks each of the tape cartridges into the correct position, as determined by the stop 46 secured to the side of the housing 10.

Having described my invention, I now claim.

1. A single cartridge tape drive mechanism comprising, a spindle for driving pressure rollers in single cartridge tape units, means for constantly rotating said spindle, means for positioning a plurality of tape cartridges with their pressure rollers biased to contact the spindle along its length, a sleeve encircling said spindle and positioned between said spindle and said cartridges, said sleeve having slots spaced along the length thereof in alignment with said pressure rollers for allowing driving contact between the pressure rollers and said spindle, said slots being circumferentially spaced one to the other so that only one pressure roller contacts said spindle at a time, and said spindle being rotatable relative to the pressure rollers.

2. A single cartridge tape drive mechanism as claimed in claim 1 in which, each of said single cartridge tape units having pressure rollers being aligned parallel to said shaft.

3. A single cartridge tape drive mechanism as claimed in claim 2 in which, the shafts of each of the pressure rollers being parallel to said spindle.

4. A single cartridge tape drive mechanism as claimed in claim 1 in which, said sleeve having indexing means for showing the relative positioning of each of the slots to each of the pressure rollers.

5. A single cartridge tape drive mechanism as slaimed in claim 1 in which, said slots only having an arcuate opening sufficient to allow said pressure roller to contact said spindle.

* * * * *